United States Patent [19]

Carlisle et al.

[11] Patent Number: 5,375,854
[45] Date of Patent: Dec. 27, 1994

[54] MECHANICAL FACE SEALS

[75] Inventors: Peter D. Carlisle, Manchester; Derek E. Cadden, Stockport, both of United Kingdom

[73] Assignee: Flexibox Limited, Manchester, United Kingdom

[21] Appl. No.: 958,342

[22] PCT Filed: May 21, 1991

[86] PCT No.: PCT/GB91/00796
§ 371 Date: Dec. 18, 1992
§ 102(e) Date: Dec. 18, 1992

[87] PCT Pub. No.: WO91/18228
PCT Pub. Date: Nov. 28, 1991

[30] Foreign Application Priority Data

May 22, 1990 [GB] United Kingdom ............... 9011388

[51] Int. Cl.5 .............................................. F16J 15/36
[52] U.S. Cl. ...................... 277/88; 277/233; 277/236; 29/454
[58] Field of Search ............... 277/88, 93 R, 93 SD, 277/200, 212 FB, 212 C, 233, 236; 29/173, 454, 447; 138/122, 134

[56] References Cited

U.S. PATENT DOCUMENTS

| 976,060 | 11/1910 | Fulton | 29/454 |
|---|---|---|---|
| 1,727,281 | 9/1929 | Fulton | 29/454 |
| 2,010,930 | 8/1935 | Rowe | 286/11 |
| 2,216,468 | 10/1940 | Farrar | 29/454 |
| 2,767,740 | 10/1956 | Fentress | 29/454 |
| 3,063,142 | 11/1962 | Kroon | 29/454 |
| 3,074,728 | 1/1963 | Freed | 277/3 |
| 3,122,375 | 2/1964 | Greenwald | 277/88 |
| 3,288,474 | 11/1966 | Gits | 277/88 |
| 3,397,894 | 8/1968 | Mastrifonte et al. | 277/88 |
| 3,800,398 | 4/1974 | Harrintgon, Jr. | 29/454 |
| 3,961,799 | 6/1976 | Peet | 277/9 |
| 4,163,563 | 8/1979 | Mullaney | 277/88 |
| 4,378,119 | 3/1983 | Luxford et al. | 277/88 |
| 4,486,484 | 12/1984 | Schafer | 138/122 X |

FOREIGN PATENT DOCUMENTS

| 0004982 | 10/1979 | European Pat. Off. | |
| 0050882 | 10/1984 | European Pat. Off. | |
| 2636120 | 3/1990 | France | |
| 2641838 | 7/1990 | France | |
| 2501000 | 7/1976 | Germany | 277/200 |
| 2502423 | 7/1976 | Germany | |

Primary Examiner—William A. Cuchlinski, Jr.
Assistant Examiner—John L. Beres
Attorney, Agent, or Firm—Woodard, Emhardt, Naughton, Moriarity & McNett

[57] ABSTRACT

A metal bellows for use in a mechanical seal is rolled from a flat sheet and seam welded along an axial diagonal line. The bellows includes corrugations or convolutions having inner and outer crowns of identical radii. The end corrugation or convolution at each end of the bellows is axially compressed to provide an annular double-thickness bearing and support surface against which an end ring is located in face-to-face connection. A similar bellows of multiple plies is similarly constructed using a plurality of tubular bodies.

12 Claims, 5 Drawing Sheets

MECHANICAL FACE SEALS

BACKGROUND OF THE INVENTION

This invention relates to mechanical face seals and to metal bellows for use therein.

A mechanical face seal generally comprises a rotary seal element and a stationary seal element usually in the form of rings in rubbing or running face-to-face sealing contact, the rotary seal ring surrounding and be secured directly or indirectly to a rotary element such, for example, as a rotary shaft and the stationary seal ring also surrounding the rotary shaft but being secured against rotation to a stationary element such, for example, as a housing within-which the shaft rotates.

One of the seal elements is movable axially of the shaft and means is provided between the housing and same to urge it into contact with the other seal element to provide the necessary sealing effect and to compensate for wear which occurs through use in the running faces of the seal rings.

The urging means may be a mechanical spring or a metal bellows, either stationary or rotatable depending upon which sealing element it is associated with, and the present invention is concerned with a mechanical face seal incorporating a metal bellows as the means for applying axial pressure and with the construction of the metal bellows per se.

The use of metal bellows in mechanical face seals has been known for many years and in various forms such, for example, as discs (washers) welded together at alternate inner and outer diameters, or a metal tube rolled or otherwise formed into corrugated or convoluted configuration.

The mechanical face seal of this invention is concerned with a metal bellows of the latter construction.

The mechanical face seal of the present invention employs a metal bellows whereof the crowns of the corrugations or convolutions have inner and outer radii of the same dimension.

SUMMARY OF THE INVENTION

According to the first aspect of the present invention there is provided a method of manufacturing a metal bellows comprising the steps of:
(i) rolling a flat metal strip into a tube of predetermined diameter with a pair of opposed edges defining an open axially extending seam;
(ii) welding said opposed edges together along the seam to form a closed tube;
(iii) deforming the tube to define along the length thereof axially-spaced corrugations or convolutions having inner and outer crowns of identical radii; and
(iv) axially compressing each end corrugation or convolution to define a double-thickness annular end bearing and support face.

Preferably the method comprises the step of rolling the flat metal strip into a tubular configuration whereof the pair of opposed edges define a diagonally-extending axial open seam.

Preferably the method comprises the step of welding to each annular end bearing and support face an end ring at the outer diameter of the end ring and end face.

According to a second aspect of the present invention there is provided a metal bellows comprising a tubular body defining axially-spaced corrugations or convolutions having inner and outer crowns of identical radii, and, at each end, an annular, double-thickness, end bearing and support face.

Preferably the bellows is of rolled construction with an axial diagonally-disposed welded seam.

Preferably the bellows has welded to each annular end bearing and support face an end ring at the outer diameter of the end face and end ring.

According to a third aspect of the present invention there is provided a method of manufacturing a metal bellows comprising the steps of:
(i) rolling a flat metal strip into a tube of predetermined diameter with a pair of opposed edges defining an open axially extending diagonal seam;
(ii) welding said opposed edges together along the seam to form a closed tube; and
(iii) deforming the tube to define along the length thereof axially-spaced corrugations or convolutions having inner and outer crowns of identical radii.

Preferably the method comprises the steps of welding an end of the bellows to an inner diameter of an end ring, and the other end to an outer diameter of another end ring.

According to a fourth aspect of the present invention there is provided metal bellows comprising a rolled, diagonally-seamed tubular body defining axially-spaced corrugations or convolutions having inner and outer crowns of identical radii.

Preferably the bellows has one end welded to an outer diameter one end ring and its other end welded to an inner diameter of another end ring.

Preferably the bellows ends lap the inner and outer circumferential surfaces of the respective end rings and the respective welding connection is made at locations axially spaced from the respective adjacent bellows corrugation or convolution.

As a result of the aforesaid bellows constructions the overall axial length of a given mechanical seal is smaller than comparable existing mechanical seals since no weld bridge exists between the bellows ends and the end rings. Also the bellows is operationally stronger due to either the weld connections to the double-thickness end bearing and support faces or to the fact that the weld connections are remote from the flexing region of the bellows.

Preferably the rolled bellows is provided with the diagonal axially-extending weld to give increased burst pressure thereto.

Preferably the mechanical bellows is formed of a material having a good operational strength which can operate over a wide temperature range and which is corrosion resistant. A preferred but not exclusive material is that sold under the Trade Name "INCONEL".

Preferably also the mechanical bellows is of two or more ply construction, preferably two ply with one thin-walled bellows fitting snugly and intimately within the other and preferably with the diagonal welded seams oppositely handed or inclined. As a result axial softness is achieved without any loss of the high pressure characteristics of the bellows. This axial softness permits easier fitment of the bellows within the mechanical seal and copes with seal face wear without compromising the sealing ability of the mechanical seal.

The two bellows plies are preferably individually sealed at each end to provide resistance to corrosion in the event of one cracking or fracturing and also to provide a pressure sealing back-up.

The mechanical bellows of the present invention preferably, compared with existing bellows, has a narrow pitch and short axial length (span), preferably but not exclusively having a span to pitch ratio of between 1:1 to 2:1.

BRIEF DESCRIPTION OF THE DRAWINGS

Embodiments of the present invention will now be described, by way of example, with reference to the accompanying drawings, in which.

DESCRIPTION OF THE PREFERRED EMBODIMENTS

Figure 1:
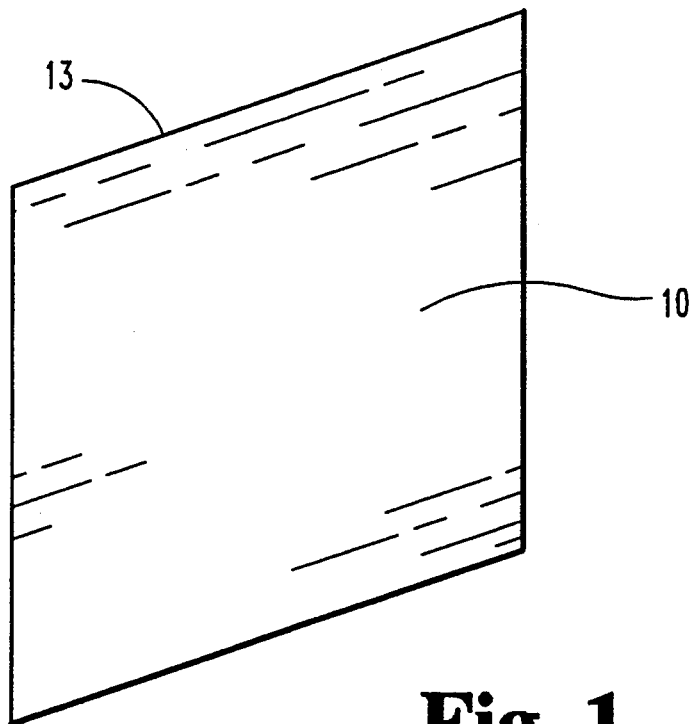
FIG. 1 is a plan view of a metal strip from which a bellows according to this invention is formed.

The tube rolling technique and the tube deformation technique to form axially-spaced corrugations and convolutions are known to those skilled in the art of metal bellows manufacture and accordingly are not described herein in detail.

The bellows according to one aspect of this invention is manufactured as follows:

(1) a flat metal strip 10 of parallelogram configuration and, for example, of 0.15 mm thickness is rolled to form a tube 11 of the required length and diameter with an open, diagonally-inclined, axially-extending open seam 12;

(2) the edges 13 of the metal strip 10 defining the open seam 12 are welded together to form a closed tube;

(3) the roll-formed and welded tube is then deformed into a bellows configuration by rollers (not shown) acting on the tube wall both internally of the tube bore and externally; and (4) a double-thickness annular end bearing and support face 14 is formed at each end of the bellows by axially compressing each end corrugation or convolution by a smearing action. More precisely, the terminal corrugation or convolution 15 at each end is severed from the bellows (see arrow C) and simultaneously the adjacent corrugation or convolution 16 is smeared (see arrow S) by the cutting device (not shown) into the axially compressed configuration 16A to form the double thickness annular end bearing and support face 14.

Figure 3:
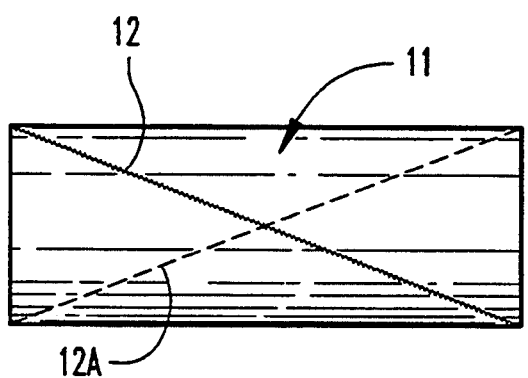
FIGS. 2 and 3 are respectively an end view and a plan view of a seam welded rolled tube.
Figure 2:
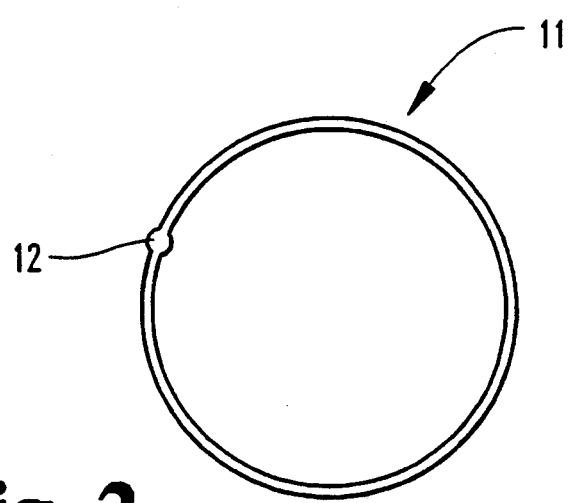
Figure 4:
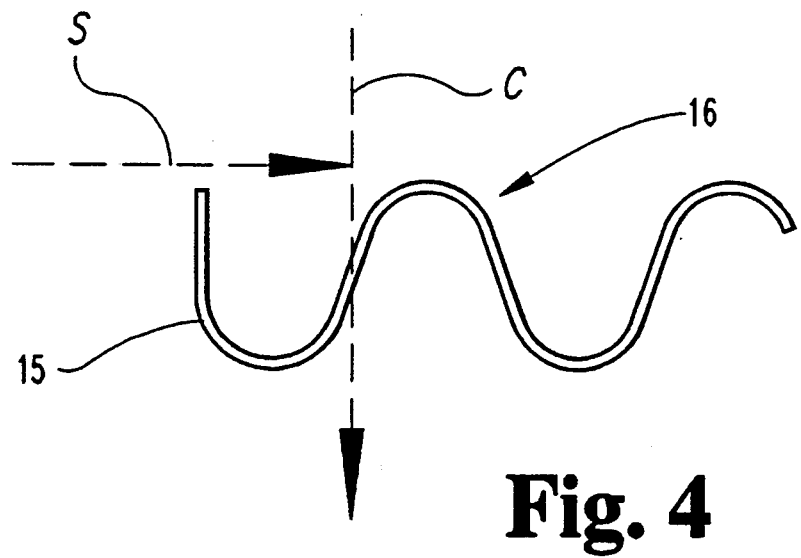
FIGS. 4 and 5 are detail views showing the formation of the annular end bearing and support face.
Figure 5:
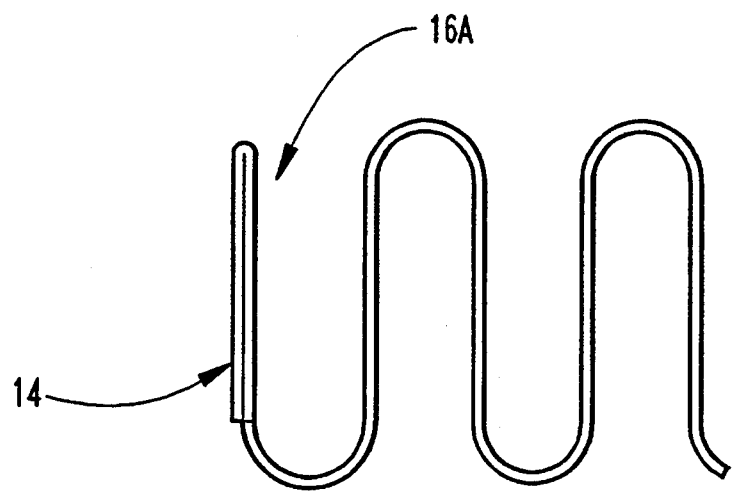

A preferred construction of bellows is a two ply bellows and this is achieved as follows:

(5) a pair of rolled seam-welded tubes are formed in accordance with steps (1) and (2) described above, the length and diameters of the tubes being such that one can be inserted inside the other with a close fit, i.e. the outer surface of the inner tube is contiguous with the inner surface of the outer tube, with the inner tube being slightly shorter in length than the outer tube so that it does not protrude from the latter at either end, and with the diagonal seams (see 12, 12A of FIG. 3) being oppositely inclined or handed. and (6) the assembly of two nesting tubes is subjected to the manufacturing steps (3) and (4) described above.

It will be manifest that the annular end bearing and support faces of a two ply bellows are particularly strong and robust each consisting, as it does, of four thicknesses of metal.

It will also be manifest that a bellows may be constituted by more than two plies of metal.

If the bellows is multi-ply then to avoid fretting between contiguous surfaces which can cause corrosion, those surfaces are coated with a protective layer of a suitable material containing polytetrafluoroethylene (PTFE) which not only resists the fretting action but also assists in lubricating these surfaces.

The rolling manufacturing process involves rolling of the metal outwards and inwards from a mid-line to avoid excessive stretching of the metal strip, and also to induce work hardening of the metal.

As has been mentioned previously the metal bellows 20 formed in accordance with the present invention forms part of a mechanical seal and for this purpose end rings 21 and 22 are welded to each flat-double-thickness annular end bearing and supporting face 23 of the bellows 20. The welding 30 is effected at the outer diameter of each end ring 21, 22 and its associated and contiguous annular end face 23, each end ring 21, 22 being formed with a weld overflow circumferential groove 21A, 22A respectively.

The end ring 21 supports and carries a sealing ring or insert 24 which may be shrunk fitted to the end ring 21 or secured thereto in any other conventional manner.

The sealing ring or insert 24 may, for example, be plain carbon or silicon carbide.

Figure 6:
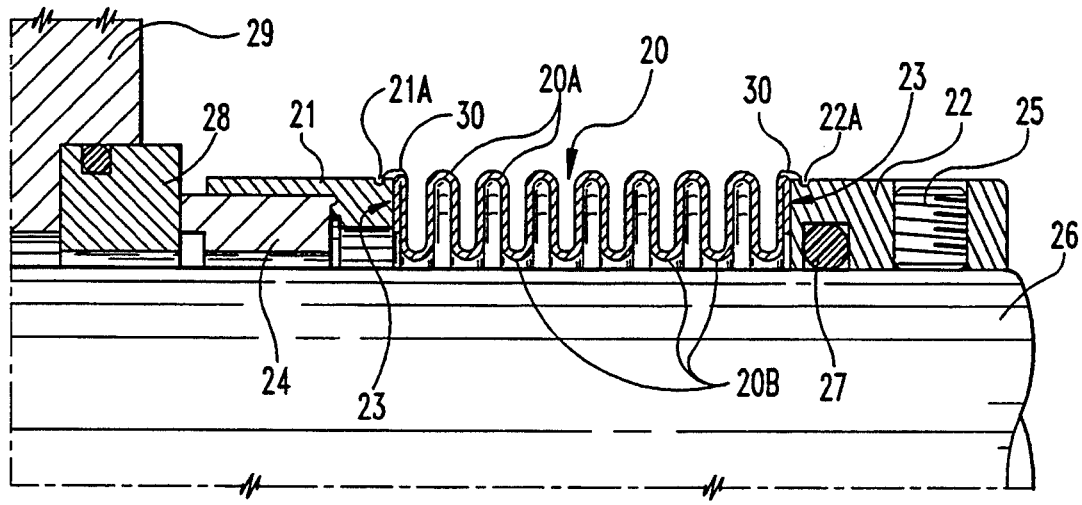
FIG. 6 is a fragmentary longitudinal half section of a mechanical seal incorporating a bellows according to the invention.
Figure 7:
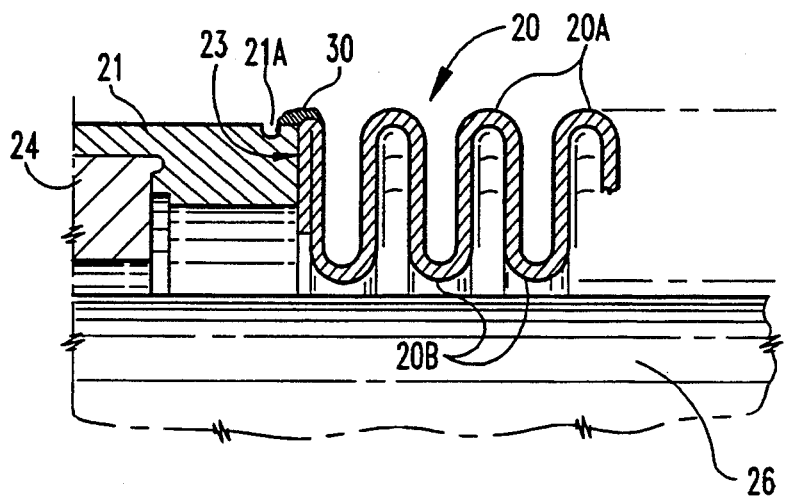
FIG. 7 is a detail view, to an enlarged scale showing the weld between end ring and the bellows.

In the embodiment shown in FIG. 6 the other end ring 22 is formed with a number of angularly-spaced tapped bores 25 (only one shown) to permit the bellows assembly 20, 21, 22 and sealing ring or insert 24 to be fastened to a rotating shaft 26 of, for example a pump, or a shaft sleeve (not shown) which is, in turn, keyed to the shaft 26.

The end ring 22 is internally grooved to accommodate a sealing O-ring 27 in contact with the shaft 26, or shaft sleeve if provided.

The sealing ring or insert 24 is in annular rubbing face-to-face contact with a sealing ring or insert 28 of silicon carbide or plain carbon fixedly secured to the housing 29 of the pump, the bellows 20 providing the necessary urging face to keep the rubbing faces in contact.

The bellows 20 is formed of "INCONEL" 625 and has, for example, a span to pitch ratio of 2:1. It has, for example, a 6 mm span which permits it to fit into all ANSI and DIN boxes which typically has a radial space of 10 mm.

The inner and outer crowns 20A, 20B of the bellows 20 have identical radii.

The corrugations or convolutions of the bellows 20 are, as shown, parallel walled which renders the bellows 20 self cleaning as it rotates thus rendering it suitable for aseptic usage applications.

Figure 8:
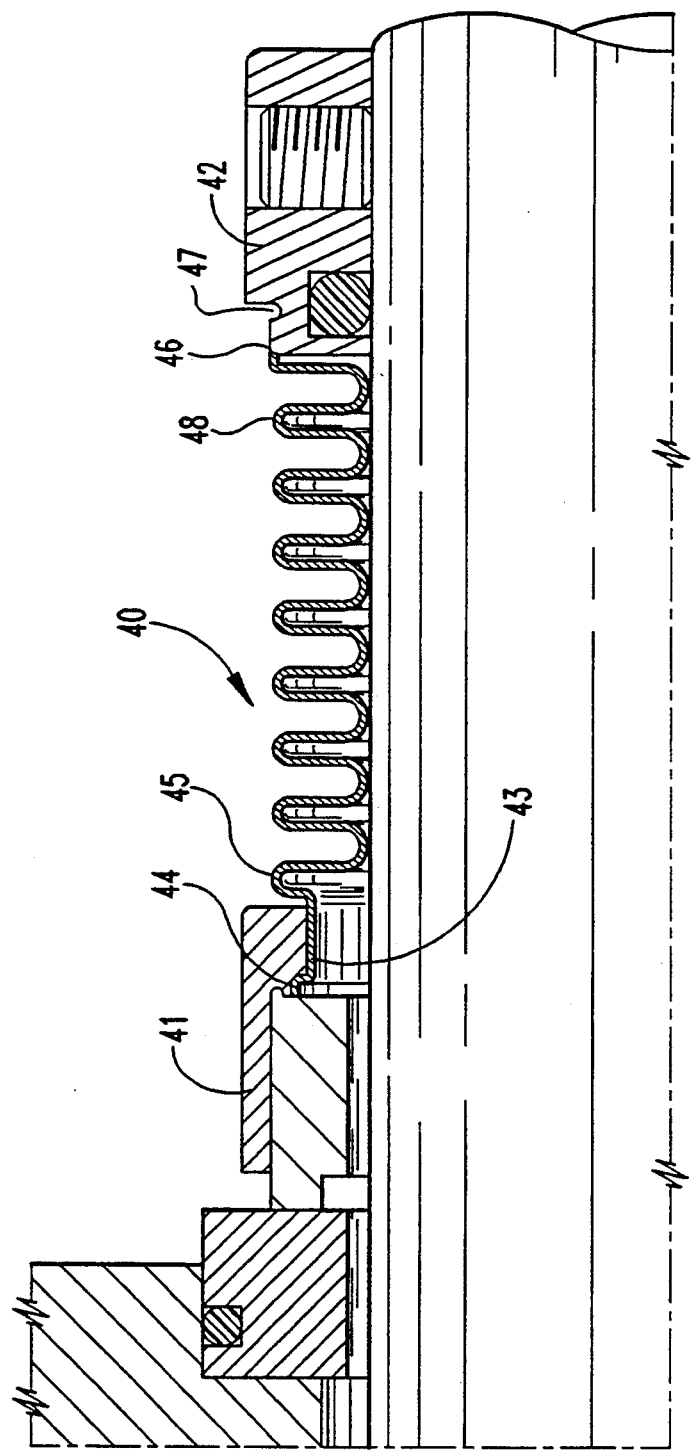
FIG. 8 is a fragmentary longitudinal half section of another embodiment of a mechanical face seal incorporating a bellows according to the invention.

Referring now to FIG. 8 of the drawings, this illustrates a mechanical face seal identical to that of FIG. 6 save for the end connections between the bellows 40 and the end rings 41, 42.

It is to be noted that the bellows 40 which, like to bellows 20, is of rolled two ply construction and diagonally seam welded does not have annular double-thickness bearing and support faces.

The bellows 40 is welded to the end rings 41 and The bellows 40, at the end ring 41 location, has a non-convoluted end length 43 which laps the inner diameter of the end ring 41 as shown and which is welded to the end ring 41 at location 44 axially remote from the adjacent bellows convolution 45 the crown of which is an outer crown of the bellows 40.

At the end ring 42, the bellows 40 has a non-convoluted end length 46 which laps the outer diameter of the end ring 42 as shown and which is welded to the end ring 42 at a location 47 axially remote from the adjacent bellows convolution 48, the crown of which is an inner crown of the bellows 40.

The location of the weldments 44 and 47 permit, as hereinbefore mentioned, the axial length of the bellows 40 and consequently the mechanical face seal to be shorter than an equivalent existing mechanical seal and also obviates or mitigates any weld fracturing tendency caused by bellows flexing.

Figure 9:
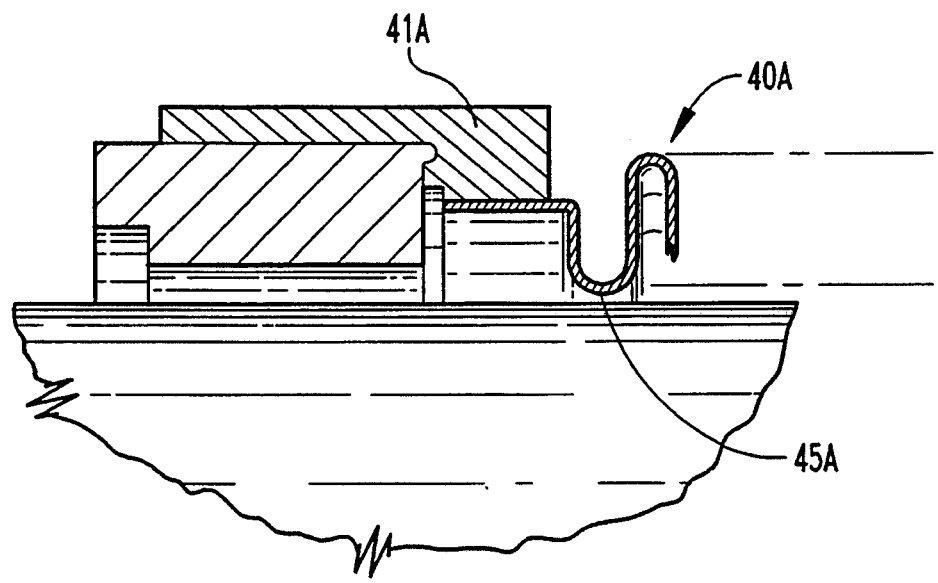
FIGS. 9 and 10 are detail views of two further modifications of the bellows of the mechanical face seal.

In FIG. 9, the welding connection between the bellows 40A and the end ring 41A is identical with that illustrated on the left hand side of FIG. 8, the crown of the convolution 45A, in this instance, being an inner crown of the bellows 40A.

Figure 10:
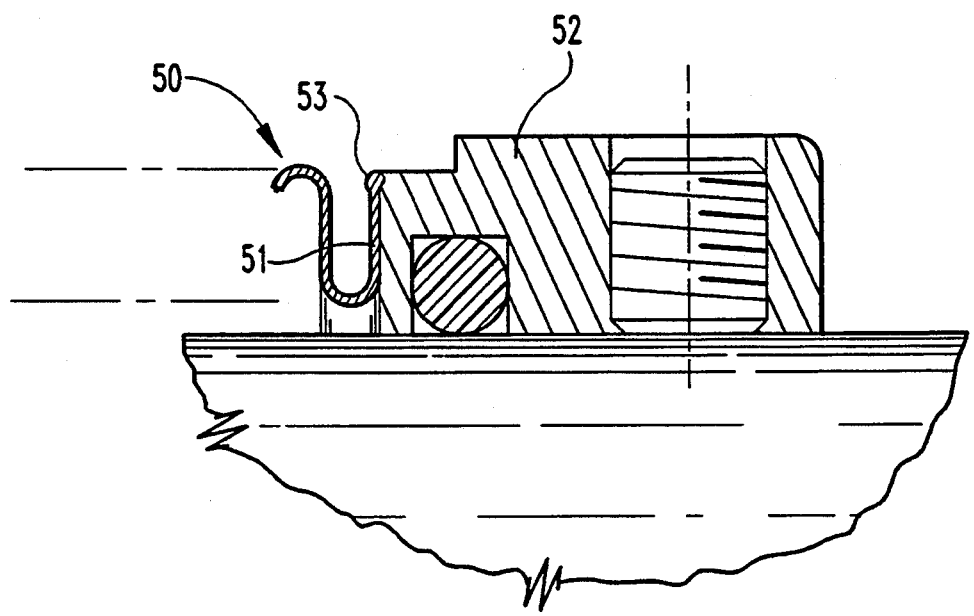

In FIG. 10, the bellows 50 has a flat annular end face 51 which laps the inner radial face of an end ring 52 and the weld connection 53 between the bellows 50 and the end ring 52 is at the outer diameter of the latter.

It is to be understood that the bellows/end ring welded connections may be identical, i.e. both inner diameter lapping, or both outer diameter lapping, or both radial lapping.

Alternatively any combination of the three lapping welding connections may be employed in a single bellows construction.

While the corrugations or convolutions of the bellows have been shown to have a constant pitch, they may alternatively have a varied pitch.

We claim:

1. A method of manufacturing a metal bellows comprising the steps of:
   (i) rolling a plurality of flat metal strips to form a pair of individual tubes of predetermined lengths and diameters, each of said plurality of tubes having a pair of opposed edges defining a diagonal open axially extending seam;
   (ii) welding the opposed edges of each of said pair of tubes together along the seam to form a closed tube having a diagonal axially-extending welded seam;
   (iii) inserting one tube within the other tube with the welded seams disposed in opposite directions or hands to define a multi-wall tube assembly;
   (iv) deforming the tube assembly to form along the length thereof axially-spaced corrugations or convolutions having inner and outer crowns of identical radii; and
   axially compressing each end corrugation or convolution to define a multiple-thickness annular end bearing and support face.

2. A method as claimed in claim 1 comprising the step of rolling each flat metal strip into a tubular configuration whereof the pair of opposed edges define a diagonally-extending axial open seam.

3. A method as claimed in claim 1 comprising the step of deforming the tube to define corrugations or convolutions spaced apart by a constant pitch.

4. A method as claimed in claim 1 comprising the step of deforming each tube to define corrugations or convolutions spaced apart by a varied pitch.

5. A metal bellows comprising a tubular body of rolled construction closed by a diagonal, axially extending welded seam and defining axially-spaced corrugations or convolutions having inner and outer crowns of identical radii, and, at each end, an annular, double-thickness, end bearing and support face.

6. A method of manufacturing a metal bellows comprising the steps of:
   (i) rolling a flat metal strip into a tube of predetermined diameter with a pair of opposed edges defining an open axially extending diagonal seam;
   (ii) welding said opposed edges together along the seam to form a closed tube; and
   (iii) deforming the tube to define along the length thereof axially-spaced corrugations or convolutions having inner and outer crowns of identical radii.

7. A method as claimed in claim 6 comprising the step of deforming the tube to define corrugations or convolutions spaced apart by a constant pitch.

8. A method as claimed in claim 6 comprising the step of deforming the tube to define corrugations or convolutions spaced apart by a varied pitch.

9. A method of manufacturing a metal bellows as claimed in claim 6 and for use in a mechanical seal comprising the step of welding an end of the bellows to an inner diameter of an end ring.

10. A method as claimed in claim 9 comprising the step of welding the other end of the bellows to an outer diameter of another end ring.

11. A metal bellows comprising a rolled, diagonally-seamed tubular body defining axially-spaced corrugations or convolutions having inner and outer crowns of identical radii and in which the tubular body is of multiply construction.

12. A metal bellows comprising a rolled, diagonally-seamed tubular body defining axially-spaced corrugations or convolutions having inner and outer crowns of identical radii and in which the diagonally-extending seam is a welded seam

* * * * *